United States Patent
Tsai et al.

(10) Patent No.: US 6,914,862 B2
(45) Date of Patent: Jul. 5, 2005

(54) DEVICE AND METHOD FOR CALIBRATING LINEAR VELOCITY AND TRACK PITCH FOR OPTICAL DISC DRIVE

(75) Inventors: Chao-Long Tsai, Hsin Chu (TW); Chi-Kwong Ho, Hsinchu (TW); Jin-Chuan Hsu, Hsinchu (TW)

(73) Assignee: Mediatek Inc., Hsin Chu (TW)

( * ) Notice: Subject to any disclaimer, the term of this patent is extended or adjusted under 35 U.S.C. 154(b) by 616 days.

(21) Appl. No.: 10/073,944

(22) Filed: Feb. 14, 2002

(65) Prior Publication Data

US 2002/0145961 A1 Oct. 10, 2002

(30) Foreign Application Priority Data

Feb. 16, 2001 (TW) ........................................ 90103682 A

(51) Int. Cl.[7] ................................................. G11B 7/00
(52) U.S. Cl. .............................. 369/47.41; 369/47.37; 369/53.3
(58) Field of Search .......................... 369/53.22, 47.37, 369/47.38, 47.39, 47.41, 53.3

(56) References Cited

U.S. PATENT DOCUMENTS

| | | | |
|---|---|---|---|
| 4,805,050 A | * 2/1989 | Aoyagi et al. | ............ 369/44.11 |
| 4,866,695 A | 9/1989 | Suzuki et al. | |
| 5,680,023 A | 10/1997 | Komaki | |
| 5,780,982 A | * 7/1998 | Tagiri | ..................... 369/53.29 |
| 5,877,623 A | 3/1999 | Min | |
| 5,920,531 A | 7/1999 | Tamura et al. | |
| 6,018,506 A | * 1/2000 | Okabe et al. | ............ 369/30.23 |
| 6,266,318 B1 | * 7/2001 | Honda et al. | ............ 369/275.3 |
| 6,690,640 B1 | * 2/2004 | Van Den Enden | ....... 369/275.4 |

* cited by examiner

Primary Examiner—Gautam R. Patel
(74) Attorney, Agent, or Firm—Birch, Stewart, Kolasch, & Birch, LLP.

(57) ABSTRACT

A device and method for calibrating linear velocity and track pitch for an optical disc is disclosed. The device comprises a frequency divider, a synchronous bit-clock generator, a counter and a linear velocity and track pitch calculator. The frequency divider receives a motor frequency generator (FG) pulse and generates a motor rotation period signal (FG/X). The synchronous bit-clock generator generates a high frequency bit-clock according to a reproduced signal read from disc. The bit counter counts the pulse of the bit-clock for each period of the motor rotation period signal to generate the data amount M. The linear velocity and track pitch calculator calculates the linear velocity by a linear velocity function with the information of the data amount M and the motor rotation period. Then, the linear velocity and track pitch calculator calculates the track pitch by a pitch function with the information of the data amount, radius and linear velocity at different tracks.

17 Claims, 5 Drawing Sheets

DEVICE AND METHOD FOR CALIBRATING LINEAR VELOCITY AND TRACK PITCH FOR OPTICAL DISC DRIVE

BACKGROUND OF THE PRESENT INVENTION

A. Field of the Present Invention

The present invention relates to a device and method for calibrating a linear velocity and a track pitch for an optical disc drive.

B. Description of the Related Art

Optical recording media, such as CD-Rs, CD-RWs, CD-ROMs, DVDs, DVD-RAMs, are usually read by optical disc drives. These optical disc drives correctly control the rotation speed of the spindle motor according to a reproduced sync signal or a motor frequency generator pulse signal. In addition, a precise calculation has to be performed using a "time-to-track" transformation mechanism, so that the laser beam can be shifted to a correct position of the disc (i.e., track jumping). The mechanism of "time-to-track" has to use the parameters of the linear velocity and the track pitch as a calculation basis. According to the current CD standard, the recording linear velocity must be between 1.2 and 1.4 m/s, while the track pitch must be between 1.5 and 1.7 μm. However, the writing speed and track pitch during actual disc playing cannot be predicted. As a result, a slowest writing speed and a maximum track pitch are used as the initial calculation basis in the prior art. Then, the values of the linear velocity and the track pitch are sequentially modified according to the relationship between the track number, which is actually fed back during the track jumping, and the time. However, the laser beam cannot be correctly and quickly shifted to the correct track in this method, thereby wasting a long period of seeking time.

To solve this problem, a method for calibrating an optical disc drive, which controls the spindle motor with a constant linear velocity (hereinafter referred to as CLV), has been disclosed. This method, however, cannot calibrate an optical disc drive, which controls the spindle motor with a constant angular velocity (hereinafter referred to as CAV). The prior art method calculates the linear velocity according to the ratio of the frame-synchronous signal and disk rotation period. In addition, the prior art method can only calibrate the linear velocity with respect to optical discs having data recorded thereon, but not the blank discs.

The linear velocity is an important index for measuring the data amount and is helpful to positioning the laser beam precisely. It is therefore an urgent to-be-solved problem as to how to effectively calibrate the linear velocity and how to apply the calibration method to both the CLV mode and the CAV mode, and to the blank discs.

SUMMARY OF THE PRESENT INVENTION

It is therefore an object of the present invention to provide a method for calibrating a linear velocity and a track pitch for an optical disc drive. The method can provide a high-precision calibration regardless of the type of the disc, which may be a blank disc or a recorded disc.

Another object of the present invention is to provide a calibration method applicable to any control mode of the spindle motor. The calibration method can provide a high-precision calibration on both the CLV and CAV control modes.

To achieve the above-mentioned objects, the present invention provides a calibration device for calibrating linear velocity and track pitch for an optical disc drive. The device includes a bit-clock generator, a counter, and a calculator. The bit-clock generator generates a bit-clock signal having a frequency higher than that of a reproduced signal according to the reproduced signal read from an optical recording medium. The counter counts the clocks of the bit-clock generating unit to generate a data amount during a motor frequency generator pulse. The calculator calculates the linear velocity and the track pitch of the optical recording medium according to the data amount and the motor frequency generator pulse.

The present invention further provides a method for calibration linear velocity and track pitch for an optical disc drive. The method includes the following steps. First, the optical disc drive is initialized. Then, the type of the optical recording medium is determined to be a blank disc or a recorded disc. Next, the laser beam is moved to the lead-in area. Then, compare the frequency generator pulse of the motor with the reproduced signal of the optical recording medium, so as to calculate a first data amount. Next, calculate the linear velocity of the optical recording medium according to the first data amount and a calibration equation. Then, move the pick-up to jump any K tracks and calculate the number of data blocks passed. Calculate a second data amount. Next, calculate the track pitch according to the linear velocity of the optical recording medium, the first and second data amount, and a track-jumping equation.

BRIEF DESCRIPTION OF THE DRAWINGS

These and other objects and advantages of the present invention will become apparent by reference to the following description and accompanying drawings wherein.

DETAIL DESCRIPTION OF THE PRESENT INVENTION

Two signals are used to compute the linear velocity in the present invention. The first signal is a frequency generator pulse (hereinafter referred to as a FG pulse), which is generated when the spindle motor in the optical disc drive rotates. The second signal is a playback signal or a reproduced signal, e.g., an EFM (eight-bit to fourteen-bit modulation) signal or a wobble signal read from an optical recording medium.

Figure 1:
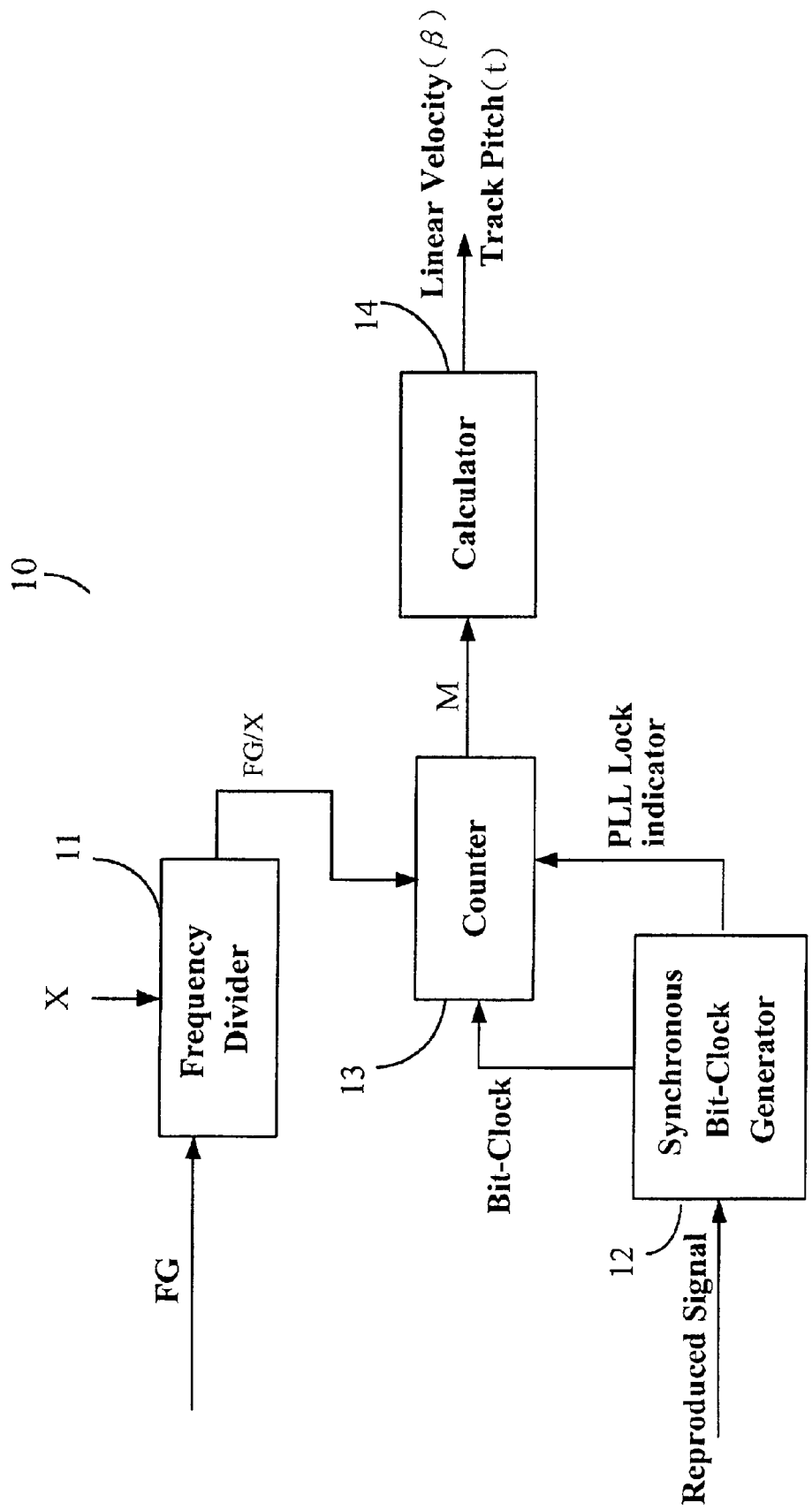
FIG. 1 is a functional block diagram showing the linear velocity calibration circuit of the present invention.

FIG. 1 is a block diagram showing a device for calibrating the linear velocity and track pitch of the present invention. As shown in the FIG. 1, a calibration device 10 includes a frequency divider 11, a synchronous bit-clock generator 12, a counter 13, a linear velocity and track pitch calculator 14.

The optical disc drive utilizes a motor speed controller (not shown) to control the rotation speed of the optical recording medium. The motor speed controller generates the FG pulses, for example 6 pulses per rotation of the spindle motor. The frequency of the FG pulses is defined as "Y". The system can calculate the number of revolutions or the values of the rotation angles by using the FG pulses, and control the motor speed in constant angular velocity. The frequency divider 11 generates a rotation period signal (FG/X) corresponding to the rotation speed of the optical recording medium according to the FG pulses and a setting value (X). If both the Y and X are 6, it means that the calculator of the calibration device 10 is one revolution of the spindle motor. That is, after the optical recording medium rotates a revolution, the frequency divider 11 generates a pulse as the rotation period signal.

Reproduced signals can be read from the optical recording medium with data recorded thereon. For example, the EFM signals may be read from the recording medium, which has been recorded data. The ATIP or wobble signals can be read from the recording medium without data recorded thereon. The synchronous bit-clock generator 12 generates a high-frequency bit-clock BC according to the reproduced signal. The synchronous bit-clock generator 12 is a phase-locked loop (PLL) circuit, and generates a bit-clock with an N-time frequency according to the input signal. At the same time, when the synchronous bit-clock generator 12 reaches a locked state, it will output a PLL-locked indication signal. The synchronous bit-clock generator 12 has different architectures under the CLV and CAV control states, and the details of the architectures will be described in the following.

After the synchronous bit-clock generator 12 outputs a PLL-locked indication signal, the counter 13 counts the pulse number of the bit-clock BC according to the rotation period signal, and generates a data amount. The counter 13 is for counting the pulse number of the bit-clock BC. Thereby, how many the data amount of the optical recording medium is recorded between two rotation period signals can be determined. The counter 13 may also output the data amount to the calculator 14.

The calculator 14 is used to calculate the linear velocity and the track pitch. The calculator 14 calculates the linear velocity $\beta$ according to Equation (1):

$$\frac{X}{Y} \times \frac{2 \cdot \pi \cdot R}{\beta} \times C = M \qquad (1)$$

wherein X/Y represents the number of revolutions of the optical recording medium, M represents the data amount outputted from the counter 13, i.e., the data amount per revolution of the rotation period signal (FG/X), C represents the output data amount of the optical recording medium per unit time, and R represents the position or the radius of the pick-up located on the optical recording medium. According to the specification of the optical recording medium, the radius R from the center of the physical disc to the location of the lead-in 0:2:0 (0th minute, 2nd second and 0th block) is 25 mm. Therefore, R can be regarded as a known parameter when calculating M at the location of 0:2:0. Since X, Y, R, C, and M are known, the linear velocity $\beta$ having the unit of m/s can be calculated.

When Equation (1) is used to calculate the linear velocity, different reproduced signals will be provided different values of C. For instance, if the reproduced signal is the EFM signals and the calculation pulse is the bit-clock, C is 75*98*588, and M represents the bit amount contained in each FG/X pulse. According a general specification, 75 data blocks can be recorded on the optical recording medium, each data block contains 98 EFM frames, each of EFM frame contains 588T (data bit clocks). As can be known form the above-mentioned information, there are 75*98*588 bit-clocks contained in a period of time when the optical recording medium rotates for one second.

Taking the CD-R or CD-RW for an example, if the calculation pulse is a wobble signal, C is 22050, and M represents the wobble-clock amount contained in each period of the FG/X pulse. If the calculation pulse is a biphase clock, C is 6300, and M represents the biphase clock amount contained in each period of the FG/X pulses.

Because X, Y, R, C, and M are all known parameters, the linear velocity $\beta$ can be surely obtained. At the same time, because the frequency of the bit-clock BC is high, the precision of the linear velocity $\beta$ is correspondingly high. As for the wobble signal or the bi-phase clock, since the resolution thereof is poor, the frequency of the signal, wobble signal or the bi-phase clock, can be multiplied to reach the resolution of the bit-clock BC. For example, the frequency of the wobble signal can be multiplied by 196, and the frequency of the bi-phase clock can be multiplied by 686. As a result, the obtained precision of the linear velocity $\beta$ can be the same as that of the bit-clock BC.

After the value of the linear velocity $\beta$ is obtained, the track pitch t can be further calculated. The present invention derives Equation (2) to calculate the track pitch t:

$$\frac{n}{75} \times \beta = 2 \cdot \pi \cdot \left(\frac{R_1 + R_2}{2}\right) \times \left(\frac{R_1 - R_2}{t}\right) \qquad (2)$$

wherein n represents the total data blocks that have been jumped, and 75 represents the data blocks passed within one second. The n/75 represents the elapsed time from the location of 0:2:0 (0th minute, 2nd second and 0th block) to another location jumped by n data blocks. The n/75*$\beta$ represents the spiral distance there between.

In Equation (2), $R_1$=25 mm is known, and the data amount $M_1$ and $M_2$ can be obtained from the calculator 14, but the value of $R_2$ is unknown. Fortunately, the linear proportion relationship between M and R can be derived from Equation (1). Therefore, $$\frac{R_1}{R_2} = \frac{M_1}{M_2}, \qquad (3)$$

$$\Rightarrow R_2 = \frac{M_2}{M_1} \times R_1.$$

The value of the track pitch t can be obtained from Equations (2) and (3) as follows:

$$t = \frac{75\pi}{n\beta} \cdot \left(\left(\frac{M_2}{M_1}\right)^2 - 1\right) \cdot R_1^2. \qquad (4)$$

As can be understood from the description mentioned above, it is possible for the architecture of FIG. 1 to use a high-precision bit-clock as a basis for calculating the linear velocity, so the resolution of the calculated track pitch is better. The reading of the reproduced signal of the present invention is not limited to the usage of the EFM sync signal, the wobble signal also can be used to instead. As a result, the calibration result with high precision may be obtained even for a blank optical recording medium. Moreover, the linear velocity calibration of the present invention is also applicable to both the CLV mode and the CAV mode.

Figure 2:
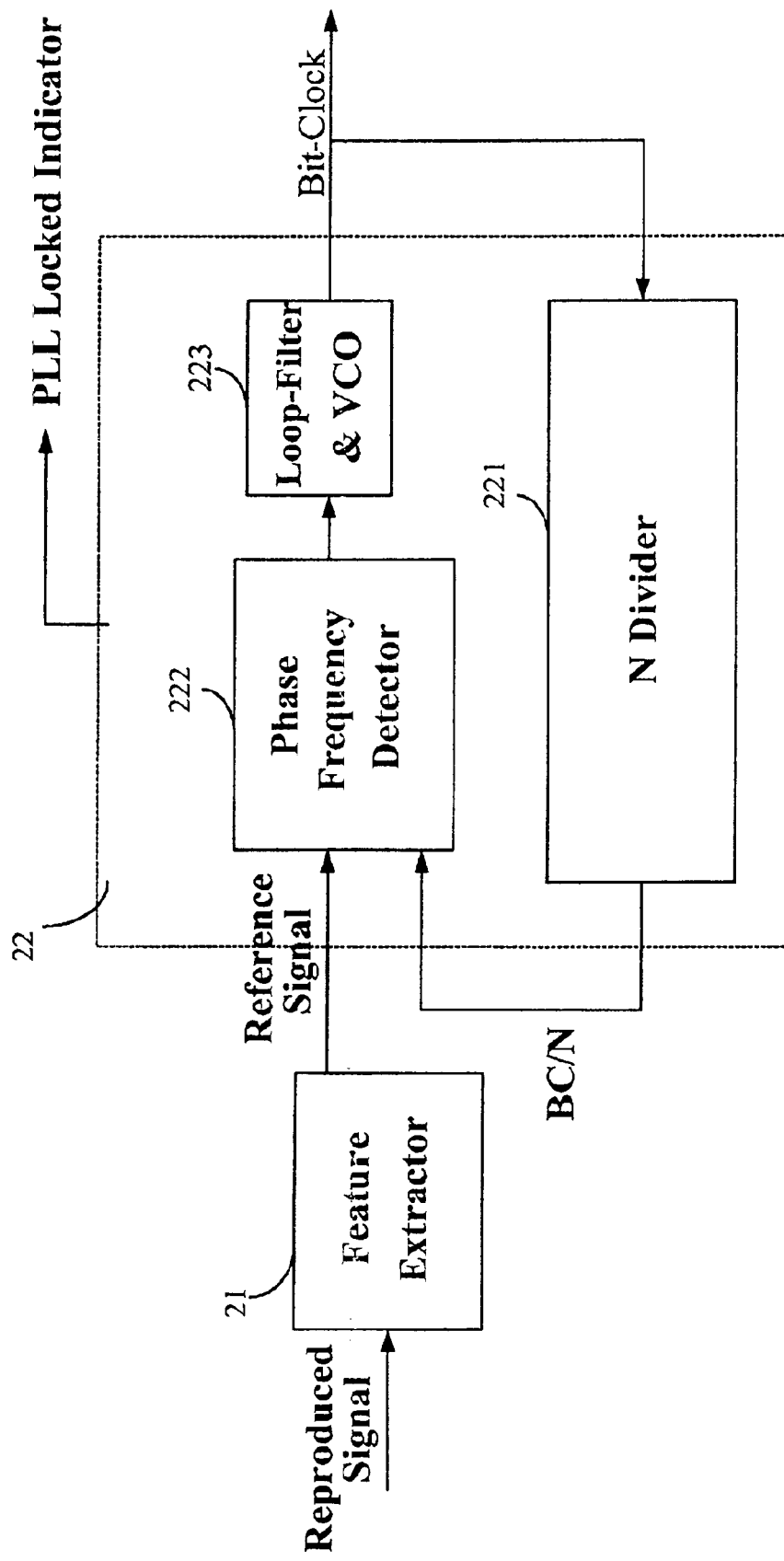
FIG. 2 is a synchronous bit-clock generator of the present invention under a CAV mode.

FIG. 2 shows an embodiment of the synchronous bit-clock generator that is applied to the CAV mode. The rotation speed of the spindle motor is constant in the CAV mode. However, the tangential velocities at different radii of the optical recording medium are different. That is, the feature pattern frequency of the reproduced signal changes with the change of the radius. The feature extractor 21 reads the reproduced signals (e.g., EFM or ATIP signals) from the optical recording medium, determines the type of the optical recording medium, and extracts the feature pattern thereof, such as sync signals, as the reference signals inputted to the phase-locked loop (PLL) circuit 22. For example, the feature pattern of the reproduced signal of the optical recording medium with data recorded thereon is the EFM sync signal, while the feature pattern of the reproduced signal of the blank optical recording medium is the ATIP sync signal, bi-phase clock or wobble clock.

The PLL circuit 22 includes an N divider 221, a phase frequency detector 222, a loop filter and voltage controlled oscillator 223. Since the function and the architecture of the PLL circuit 22 are the same as those in a general PLL circuit, the detailed descriptions are omitted. The bit-clock generator 12 traces the frequency change of the feature pattern owing to the radius change of the location of the pick-up to generate the bit-clock signal by using the PLL circuit 22. In addition, since the PLL circuit 22 includes an N divider 221, where N can be set as 588 when taking the EFM as an example, so as to generate a bit-clock signal having the same frequency as that of the data bit of the recording medium.

Figure 3:
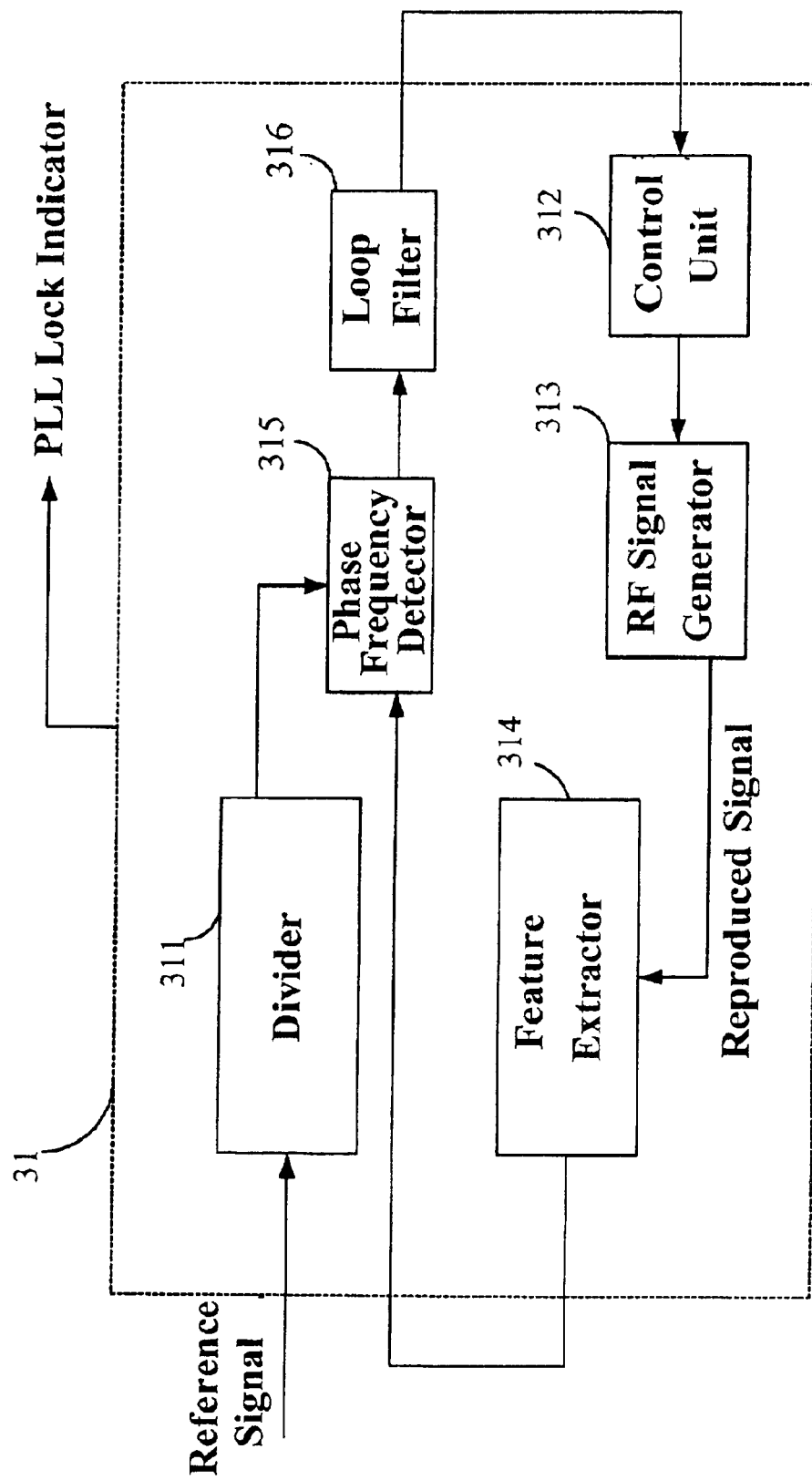
FIG. 3 is a synchronous bit-clock generator of the present invention under a CLV mode.

FIG. 3 shows an embodiment of the synchronous bit-clock generator applied to the CLV mode. The rotation speed of the spindle motor is not constant in the CLV mode. However, the tangential velocities at different radii of the optical recording medium are the same. The difference between FIGS. 3 and 2 resides in that the embodiment of FIG. 3 sets the reference signal (bit-clock) to be one with a constant frequency, obtains the desired linear velocity by controlling the rotation speed of the motor, and generates a reproduced feature pattern capable of locking the reference signal. In the embodiment of FIG. 2, however, the rotation speed of the motor is regarded as a constant value.

As shown in FIG. 3, a frequency divider 311 divides the frequency of the constant bit-clock by N. A phase frequency detector 315 and a loop filter 316 receive the output signals from the frequency divider 311 and a feature extractor 314, and generate the control signals for a control unit 312. The control unit 312 controls the rotation speed of the spindle motor of the disc drive according to the control signals, so as to keep the same linear velocity for the disc placed thereon. The RF signal generator 313 is used to read the reproduced signal of the disc. The feature extractor 314 extracts the feature pattern of the reproduced signal as the feedback signal for the PLL circuit, and determines the type of the reproduced signal on the optical recording medium. The function and method are the same as those in the embodiment of FIG. 2.

Compared to the functional block diagram of FIG. 1, if the embodiment of FIG. 2 is adopted by the synchronous bit-clock generator 12, it means that the frequency of the FG pulse is a constant value. On the contrary, if the embodiment of FIG. 3 is adopted, it means that the frequency of the FG pulse changes under the control of the motor speed controller 312 in the synchronous bit-clock generator 12. In fact, FIGS. 2 and 3 have the similar design rules in which the FG pulse of the motor and the reproduced signal are adopted.

Figure 4A:
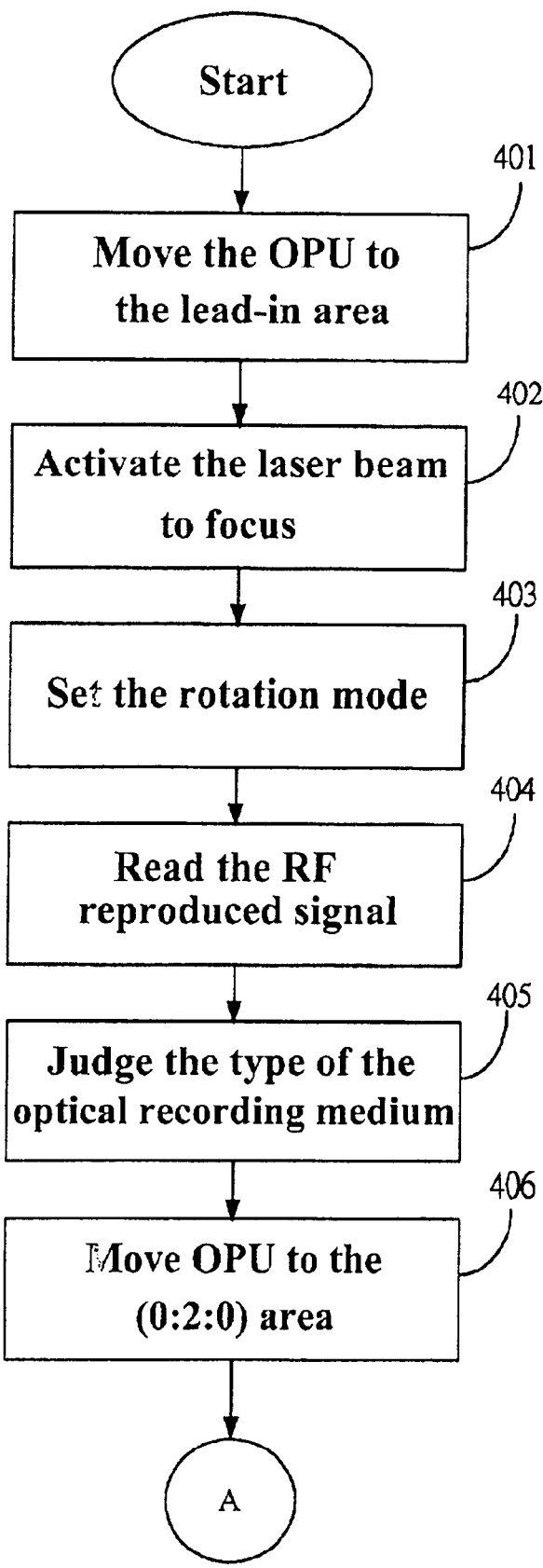
FIGS. 4A to 4B are flow charts showing the calibration steps of the present invention.
Figure 4B:
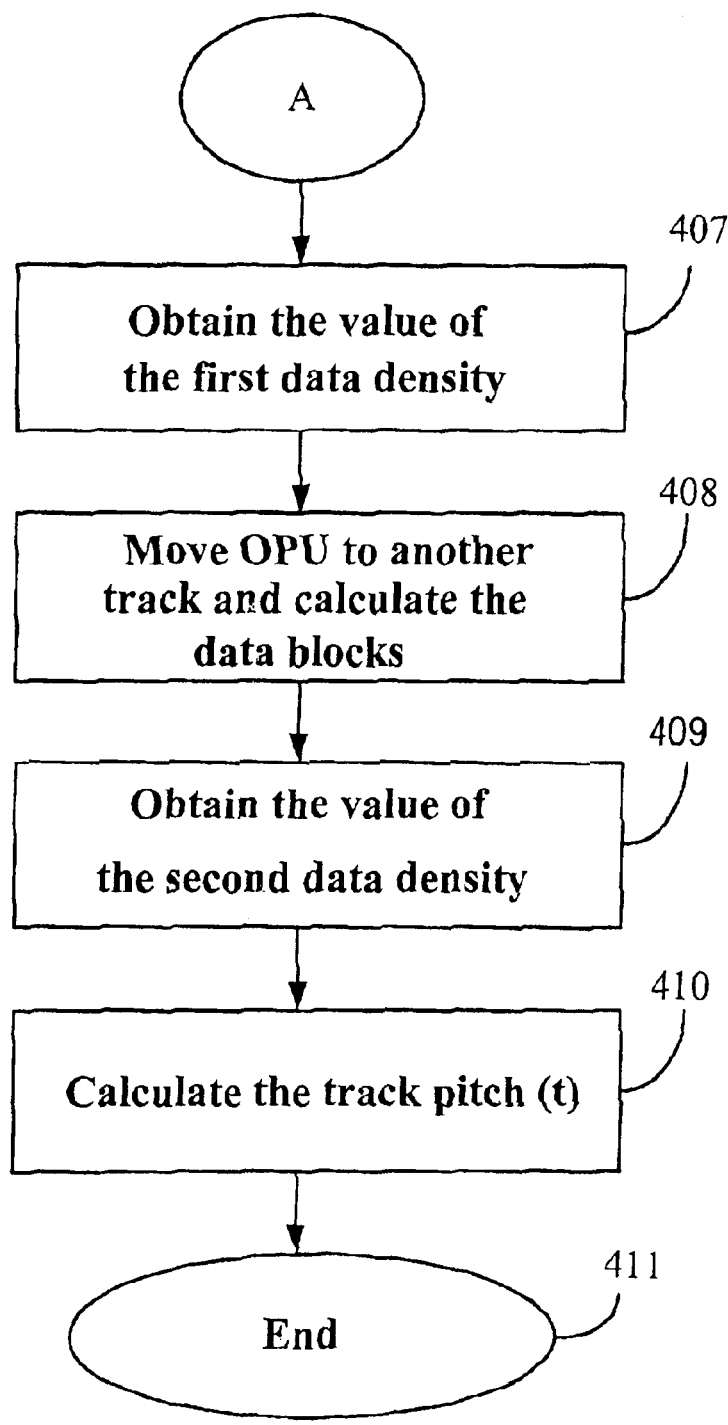

According to the descriptions mentioned above, the flow chart of the method of calibrating the linear velocity and track pitch of the present invention is shown in FIG. 4. From the calculations mentioned above, the calibrated linear velocity β and track pitch t can be obtained.

Steps 401 to 404 are generalized initial processes. First, at step 401, the optical pick-up (OPU) is moved to the lead-in area. Then, at step 402, the laser beam is activated to focus so as to read the RF signal that is reflected back from the optical recording medium. Next, at step 403, the motor is controlled to be the CLV mode or the CAV mode. Then, at step 404, the operations of track-locking and reading are performed so as to align the track and read the RF reproduced signal.

At step 405, it is judged that whether the optical recording medium contains data according to whether an EFM signal is contained in the RF reproduced signal. If the optical recording medium is a blank medium, the ATIP signal is used as a basis for calibrating the signal. Otherwise, the EFM signal is used as a basis for calibrating the signal. Then, at step 406, the optical recording medium is configured to locate at 0:2:0, the initial position of the data record. That is, the optical recording medium is configured to locate at a position of radius of 25 mm ($R_1$) of the optical recording medium.

Then, the calculator in FIG. 1 is activated to compare the frequency generator pulse of the motor with the reproduced signal of the optical recording medium, so as to obtain the value of the first data amount $M_1$. Next, at the step 407, the linear velocity β of the optical recording medium are calculated according to the first data amount $M_1$ and the above-mentioned equations for calculating the linear velocity.

Then, at step 408, the OPU is moved by any K tracks to the location of a radius of $R_2$ to measure the time code for reaching the location and to calculate the data blocks n or block number passed by the jumping of K tracks. Next, at step 409, the calculator is again activated to compare the frequency generator pulse of the motor with the reproduced signal of the optical recording medium, so as to calculate the value of the second data amount $M_2$.

After the values of $M_1$, $M_2$, and the linear velocity β is obtained, the value of track pitch t can be obtained from the above-mentioned track-jumping equation (4), so as to precisely get the track pitch. Finally, at step 411, the calibration processes are ended.

To sum up, the present invention is applicable to high-precision calibrations under any constant rotation speed regardless of the configuration of the optical disc drive is a CLV mode or a CAV mode. Furthermore, since the present invention uses the bit-clock signal as a measurement unit, the calibration result can be more precise in comparison with the prior art using the EFM sync signal. Moreover, the present invention can use the ATIP signal as a basis for calibration, the linear velocity calibration also can be performed even though no data is recorded on the optical recording medium.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A calibration device for calibrating a linear velocity and a track pitch for an optical disc drive, comprising:
    a bit-clock generator for generating a bit-clock signal having a frequency higher than that of a reproduced signal according to the reproduced signal read from an optical recording medium;
    a data amount counting unit for counting the pulses of the bit-clock signal for each motor frequency generator pulse to generate a data amount; and
    a calculator for calculating the linear velocity and the track pitch of the optical recording medium according to the data amount and the motor frequency generator pulse.

2. The calibration device according to claim 1, further comprising a frequency divider for receiving an output pulse from a spindle motor to generate the motor frequency generator pulse according to a setting value.

3. The calibration device according to claim 2, wherein the bit-clock generator comprises:

a feature extractor for determining the type of the optical recording medium according to the reproduced signal, and outputting a feedback signal;

a phase-locked loop circuit for receiving the feedback signal from the feature extractor and a constant-frequency pulse, and generating a control signal;

a control unit for controlling the rotation speeds of the spindle motor and the disc according to the control signal from the phase-locked loop circuit; and an RF signal generator for generating the reproduced signal of the disc.

4. The calibration device according to claim 3, wherein the reproduced signal is an EFM sync signal, an ATIP signal or a wobble signal.

5. The calibration device according to claim 2, wherein the calculator calculates the linear velocity β according to the following equation:

$$\frac{X}{Y} \times \frac{2 \cdot \pi \cdot R}{\beta} \times C = M,$$

wherein Y represents the pulse number per revolution of the spindle motor, X is a frequency divisor of the motor frequency generator pulse, M is the data amount measured from the counter, R represents the radius of the position where an optical pick-up located on the optical recording medium, and C represents a bit-clock amount contained in the optical recording medium per unit time.

6. The calibration device according to claim 5, wherein the position of the radius R is a position of 0th minute, 2nd second and 0th block, and R=25 mm.

7. The calibration device according to claim 5, wherein the calculator calculates the track pitch t according to the following eqution:

$$t = \frac{75\pi}{n\beta} \cdot \left( \left(\frac{M_2}{M_1}\right)^2 - 1 \right) \cdot R_1^2,$$

wherein n represents the number of data blocks passed after any K tracks are jumped, 75 represents the number of data blocks contained in one second, $R_1$ represents a first radius of the optical pick-up, $M_1$ represents a first data amount, and $M_2$ represents a second data amount.

8. The calibration device according to claim 7, wherein the position of the radius R is a position of 0th minute, 2nd second and 0th block, and R=25 mm.

9. The calibration device according to claim 1, wherein the data amount counting unit is a counter.

10. The calibration device according to claim 1, wherein the bit-clock generator comprises:

a feature extractor for determining the type of the optical recording medium according to the reproduced signal, and outputting a reference signal; and a phase-locked loop circuit for outputting the bit-clock signal according to the reference signal.

11. The calibration device according to claim 10, wherein the reproduced signal is an EFM sync signal, an ATIP signal or a wobble signal.

12. A method for calibration a linear velocity and a track pitch for an optical disc drive, comprising the steps of:

initializing the optical disc drive;

determining the type of the optical recording medium;

moving a pick-up to a lead-in area;

comparing a frequency generator pulse of the motor with a reproduced signal of the optical recording medium so as to get a value of a first data amount;

calculating the linear velocity of the optical recording medium according to the value of the first data amount and a calculation equation;

calculating the number of data blocks passed after any tracks are jumped, and getting a value of a second data amount of the tracks; and calculating the track pitch, t according to the linear velocity of the optical recording medium, the value of the second data amount, and a track-jumping equation.

13. The method according to claim 12, wherein the step of initializing the optical disc drive comprises the following steps of:

moving the pick-up to the lead-in area;

activating a laser beam and focusing the laser beam;

setting a rotation control mode for the motor; and positioning a track and reading the reproduced signal on the disc.

14. The method according to claim 12, wherein the equation for calculating the linear velocity β is:

$$\frac{X}{Y} \times \frac{2 \cdot \pi \cdot R}{\beta} \times C = M,$$

wherein Y represents the pulse number generated after the motor rotates a revolution, X is a frequency divisor of the motor frequency generator pulse, M is a value of the data amount, R represents the radius of the position where an optical pick-up located on the optical recording medium, and C represents a bit-clock amount contained in the optical recording medium per unit time.

15. The method according to claim 12, wherein the equation for calculating the track pitch is:

$$t = \frac{75\pi}{n\beta} \cdot \left( \left(\frac{M_2}{M_1}\right)^2 - 1 \right) \cdot R_1^2,$$

wherein n represents the number of data blocks that are jumped, 75 represents the number of data blocks contained in one second, $R_1$ represents a first radius of the position of the pick-up when the pick-up starts, $M_1$ represents a first calculated data amount, and $M_2$ represents a second calculated data amount.

16. The method according to claim 15, wherein the position of the radius R is a position of 0th minute, 2nd second and 0th block, and R=25 mm.

17. The method according to claim 12, wherein the reproduced signal includes an EFM sync signal, an ATIP signal or a wobble signal.

* * * * *